(12) United States Patent
Sun et al.

(10) Patent No.: US 10,832,123 B2
(45) Date of Patent: Nov. 10, 2020

(54) COMPRESSION OF DEEP NEURAL NETWORKS WITH PROPER USE OF MASK

(71) Applicant: BEIJING DEEPHI INTELLIGENCE TECHNOLOGY CO., LTD., Beijing (CN)

(72) Inventors: Shijie Sun, Beijing (CN); Song Han, Beijing (CN); Xin Li, Beijing (CN); Yi Shan, Beijing (CN)

(73) Assignee: XILINX TECHNOLOGY BEIJING LIMITED, Beijing (CN)

( * ) Notice: Subject to any disclaimer, the term of this patent is extended or adjusted under 35 U.S.C. 154(b) by 570 days.

(21) Appl. No.: 15/390,660

(22) Filed: Dec. 26, 2016

(65) Prior Publication Data

US 2018/0046915 A1 Feb. 15, 2018

Related U.S. Application Data

(63) Continuation-in-part of application No. 15/242,625, filed on Aug. 22, 2016, which is a
(Continued)

(30) Foreign Application Priority Data

Aug. 12, 2016 (CN) .......................... 2016 1 0663175
Aug. 12, 2016 (CN) .......................... 2016 1 0663201
(Continued)

(51) Int. Cl.
*G06N 3/04* (2006.01)
*G06N 3/08* (2006.01)

(52) U.S. Cl.
CPC ......... *G06N 3/0445* (2013.01); *G06N 3/0454* (2013.01); *G06N 3/082* (2013.01)

(58) Field of Classification Search
CPC .... G06N 3/0445; G06N 3/0454; G06N 3/082; F06N 3/082; G06L 9/00362
See application file for complete search history.

(56) References Cited

U.S. PATENT DOCUMENTS 9,317,482 B2 4/2016 Davis et al.
2010/0278420 A1* 11/2010 Shet .................. G06K 9/00369
382/156
(Continued)

FOREIGN PATENT DOCUMENTS

CN 102129397 A 7/2011
CN 104915322 A 9/2015
(Continued)

OTHER PUBLICATIONS

Liu, B., Wang, M., Foroosh, H., Tappen, M., & Pensky, M. (2015). Sparse convolutional neural networks. In Proceedings of the IEEE Conference on Computer Vision and Pattern Recognition (pp. 806-814). (Year: 2015).*
(Continued)

*Primary Examiner* — Alan Chen
(74) *Attorney, Agent, or Firm* — IPro, PLLC

(57) ABSTRACT

The present invention relates to artificial neural networks, for example, deep neural networks. In particular, the present invention relates to a compression method for deep neural networks with proper use of mask and the device thereof. More specifically, the present invention relates to how to compress dense neural networks into sparse neural networks while maintaining or even improving the accuracy of the neural networks after compression.

9 Claims, 16 Drawing Sheets

Related U.S. Application Data continuation-in-part of application No. 15/242,624, filed on Aug. 22, 2016, which is a continuation-in-part of application No. 15/242,622, filed on Aug. 22, 2016, now Pat. No. 10,621,486.

(30) Foreign Application Priority Data

Aug. 12, 2016 (CN) .......................... 2016 1 0663563
Dec. 5, 2016 (CN) .......................... 2016 1 1104482

(56) References Cited

U.S. PATENT DOCUMENTS

| | | | | |
|---|---|---|---|---|
| 2016/0013773 | A1* | 1/2016 | Dourbal | G06F 17/16 708/209 |
| 2016/0180195 | A1* | 6/2016 | Martinson | G06N 3/0472 382/103 |
| 2016/0210533 | A1* | 7/2016 | Kiapour | G06K 9/00979 |
| 2016/0307072 | A1* | 10/2016 | Zhou | G06T 7/0004 |
| 2016/0328643 | A1* | 11/2016 | Liu | G06N 3/0454 |

FOREIGN PATENT DOCUMENTS

| | | |
|---|---|---|
| CN | 105488565 A | 4/2016 |
| CN | 205139973 U | 4/2016 |
| CN | 105681628 A | 6/2016 |
| CN | 105760933 A | 7/2016 |

OTHER PUBLICATIONS

Han, S., Pool, J., Tran, J., & Dally, W. (2015). Learning both weights and connections for efficient neural network. In Advances in neural information processing systems (pp. 1135-1143). (Year: 2015).*
Hertel, L., Barth, E., Käster, T., & Martinetz, T. (Jul. 2015). Deep convolutional neural networks as generic feature extractors. In 2015 International Joint Conference on Neural Networks (IJCNN) (pp. 1-4). IEEE. (Year: 2015).*
Liu, B., Wang, M., Foroosh, H., Tappen, M., & Pensky, M. (2015). Sparse convolutional neural networks. In Proceedings of the IEEE Conference on Computer Vision and Pattern Recognition (pp. 806-814). (Year: 2015).*
Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]//Interspeech. 2014: 338-342.
16. Long short-term memory based recurrent neural network architectures for large vocabulary speech recognition[J]. arXiv preprint arXiv:1402.1128, 2014.
18. Deep compression: Compressing deep neural networks with pruning, trained quantization and Huffman coding.
19. Diannao: A small-footprint high-throughput accelerator for ubiquitous machine-learning.
21. Dadiannao: A machine-learning supercomputer.
22. Shidiannao: shifting vision processing closer to the sensor.
23. DSD: Regularizing Deep Neural Networks with Dense-Sparse-Dense Training Flow in NIPS 2016.
Learning both Weights and Connections for Efficient Neural Networks, arXiv:1506.02626v3 [cs.NE] Oct. 30, 2015.
2. Reconfigurable pipelined 2-d convolvers for fast digital signal processing.
12. A dynamically configurable coprocessor for convolutional neural networks.
3. Second order derivatives for network pruning: Optimal brain surgeon.
5. Cnp: An fpga-based processor for convolutional networks.
6. Optimizing fpga-based accelerator design for deep convolutional neural networks.
7. Pudiannao: A polyvalent machine learning accelerator.
8. DSD: Regularizing Deep Neural Networks with Dense-Sparse-Dense Training Flow in NIPS 2016.
9. Long Short-term Memory, Neural Computation 9(8):1735-80 • Dec. 1997, DOI: 10.1162/neco.1997.9.8.1735.
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.

* cited by examiner

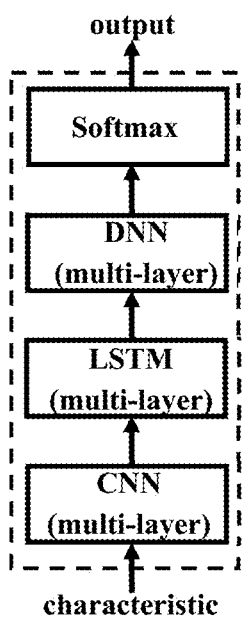 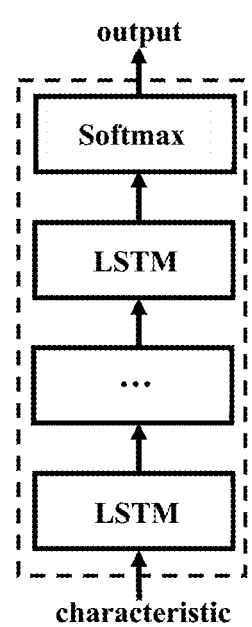
Fig. 5(a)  Fig. 5(b)
Fig. 5 (PRIOR ART)

COMPRESSION OF DEEP NEURAL NETWORKS WITH PROPER USE OF MASK

CROSS REFERENCE TO RELATED APPLICATIONS

This application claims priority to Chinese Patent Application Number 201611104482.0 filed on Dec. 5, 2016, Chinese Patent Application Number 201610663201.9 filed on Aug. 12, 2016 and Chinese Patent Application Number 201610663563.8 filed on Aug. 12, 2016, Chinese Patent Application Number 201610663175.X filed on Aug. 12, 2016, U.S. application Ser. No. 15/242,622 filed on Aug. 22, 2016, U.S. application Ser. No. 15/242,624 filed on Aug. 22, 2016, U.S. application Ser. No. 15/242,625 filed on Aug. 22, 2016, the entire contents of which are incorporated herein by reference.

TECHNICAL FIELD

The present invention relates to a compression method for deep neural networks with proper use of a mask and a device thereof.

BACKGROUND ART

Compression of Artificial Neural Networks

Artificial Neural Networks (ANNs), also called NNs, are a distributed parallel information processing models which imitate behavioral characteristics of animal neural networks. In recent years, studies of ANNs have achieved rapid developments, and ANNs have been widely applied in various fields, such as image recognition, speech recognition, natural language processing, weather forecasting, gene expression, contents pushing, etc.

In neural networks, there exists a large number of nodes (also called neurons) which are connected to each other. Neural networks have two features: 1) Each neuron calculates the weighted input values from other adjacent neurons via certain output function (also called Activation Function); 2) The information transmission intensity between neurons is measured by so-called weights, and such weights might be adjusted by self-learning of certain algorithms.

Early neural networks have only two layers: the input layer and the output layer. Thus, these neural networks cannot process complex logic, limiting their practical use.

As shown in FIG. 1, Deep Neural Networks (DNNs) have revolutionarily addressed such defect by adding a hidden intermediate layer between the input layer and the output layer.

Moreover, Recurrent Neural Networks (RNNs) are commonly used DNN models, which differ from conventional Feed-forward Neural Networks in that RNNs have introduced oriented loop and are capable of processing forward-backward correlations between inputs. In particular, in speech recognition, there are strong forward-backward correlations between input signals. For example, one word is closely related to its preceding word in a series of voice signals. Thus, RNNs has been widely applied in speech recognition domain.

However, the scale of neural networks is exploding due to rapid developments in recent years. Some of the advanced neural network models might have hundreds of layers and billions of connections, and the implementation thereof is both calculation-centric and memory-centric. Since neural networks are becoming larger, it is critical to compress neural network models into smaller scale.

For example, in DNNs, connection relations between neurons can be expressed mathematically as a series of matrices. Although a well-trained neural network is accurate in prediction, its matrices are dense matrices. That is, the matrices are filled with non-zero elements, consuming extensive storage resources and computation resources, which reduces computational speed and increases costs. Thus, it faces huge challenges in deploying DNNs in mobile terminals, significantly restricting practical use and development of neural networks.

FIG. 2 shows a compression method which was proposed by one of the inventors in earlier works.

As shown in FIG. 2, the compression method comprises learning, pruning, and training the neural network. In the first step, it learns which connection is important by training connectivity. The second step is to prune the low-weight connections. In the third step, it retrains the neural networks by fine-tuning the weights of neural network. In recent years, studies show that in the matrix of a trained neural network model, elements with larger weights represent important connections, while other elements with smaller weights have relatively small impact and can be removed (e.g., set to zero). Thus, low-weight connections are pruned, converting a dense network into a sparse network.

FIG. 3 shows synapses and neurons before and after pruning according to the method proposed in FIG. 2.

The final step of FIG. 2 involves retraining the sparse network to learn the final weights for the remaining sparse connections. By retraining the sparse network, the remaining weights in the matrix can be adjusted, ensuring that the accuracy of the network will not be compromised.

By compressing a dense neural network into a sparse neural network, the computation amount and storage amount can be effectively reduced, achieving acceleration of running an ANN while maintaining its accuracy. Compression of neural network models are especially important for specialized sparse neural network accelerator.

Speech Recognition Engine

Speech recognition is a widely applicable field of ANNs. Speech recognition is to sequentially map analogue signals of a language to a specific set of words. In recent years, methods applying ANNs have achieved much better effects than conventional methods in speech recognition domain, and have become the mainstream in the industry. In particular, DNNs have been widely applied in speech recognition domain.

As a practical example of using DNNs, a general frame of the speech recognition engine is shown in FIG. 4.

In the model shown in FIG. 4, it involves computing acoustic output probability using a deep learning model. That is, conducting similarity prediction between a series of input speech signals and various possible candidates. Running the DNN in FIG. 4 can be accelerated via FPGA, for example.

FIG. 5 shows a deep learning model applied in the speech recognition engine of FIG. 4.

More specifically, FIG. 5(a) shows a deep learning model including CNN (Convolutional Neural Network) module, LSTM (Long Short-Term Memory) module, DNN (Deep Neural Network) module, Softmax module, etc.

FIG. 5(b) is a deep learning model where the present invention can be applied, which uses multi-layer LSTM.

In the network model shown in FIG. 5(b), the input of the network is a section of voice. For example, for a voice of about 1 second, it will be cut into about 100 frames in sequence, and the characteristics of each frame is represented by a float type vector.

LSTM

Further, in order to solve long-term information storage problem, Hochreiter & Schmidhuber has proposed the Long Short-Term Memory (LSTM) model in 1997.

FIG. 6 shows a LSTM network model applied in speech recognition. LSTM neural network is one type of RNN, which changes simple repetitive neural network modules in normal RNN into complex interconnecting relations. LSTM neural networks have achieved very good effect in speech recognition.

For more details of LSTM, prior art references can be made mainly to the following two published papers: Sak H, Senior A W, Beaufays F. Long short-term memory recurrent neural network architectures for large scale acoustic modeling[C]//INTERSPEECH. 2014: 338-342; Sak H, Senior A, Beaufays F. Long short-term memory based recurrent neural network architectures for large vocabulary speech recognition[J]. arXiv preprint arXiv:1402.1128, 2014.

As mentioned above, LSTM is one type of RNN. The main difference between RNNs and DNNs lies in that RNNs are time-dependent. More specifically, the input at time T depends on the output at time T−1. That is, calculation of the current frame depends on the calculated result of the previous frame.

In the LSTM architecture of FIG. 6:

Symbol i represents the input gate i which controls the flow of input activations into the memory cell;

Symbol o represents the output gate o which controls the output flow of cell activations into the rest of the network;

Symbol f represents the forget gate which scales the internal state of the cell before adding it as input to the cell, therefore adaptively forgetting or resetting the cell's memory;

Symbol g represents the characteristic input of the cell;

The bold lines represent the output of the previous frame;

Each gate has a weight matrix, and the computation amount for the input of time T and the output of time T−1 at the gates is relatively intensive;

The dashed lines represent peephole connections, and the operations correspond to the peephole connections and the three cross-product signs are element-wise operations, which require relatively little computation amount.

FIG. 7 shows an improved LSTM network model.

As shown in FIG. 7, in order to reduce the computation amount of the LSTM layer, an additional projection layer is introduced to reduce the dimension of the model.

The LSTM network accepts an input sequence x=(x1, . . . , xT), and computes an output sequence y=(y1, . . . , yT) by using the following equations iteratively from t=1 to T:

$$i_t = \sigma(W_{ix}x_t + W_{ir}y_{t-1} + W_{ic}c_{t-1} + b_i)$$

$$f_t = \sigma(W_{fx}x_t + W_{fr}y_{t-1} + W_{fc}c_{t-1} + b_f)$$

$$c_t = f_t \odot c_{t-1} + i_t \odot g(W_{cx}x_t + W_{cr}y_{t-1} + b_c)$$

$$o_t = \sigma(W_{ox}x_t + W_{or}y_{t-1} + W_{oc}c_t + b_o)$$

$$m_t = o_t \odot h(c_t)$$

$$y_t = W_{ym}m_t$$

Here, the W terms denote weight matrices (e.g., Wix is the matrix of weights from the input gate to the input), and Wic, Wfc, Woc are diagonal weight matrices for peephole connections which correspond to the three dashed lines in FIG. 7. The b terms denote bias vectors ($b_i$ is the gate bias vector), a is the logistic sigmoid function. The symbols i, f, o, c are respectively the input gate, forget gate, output gate and cell activation vectors, and all of which are the same size as the cell output activation vectors m. ⊙ is the element-wise product of the vectors, g and h are the cell input and cell output activation functions, generally tan h.

When designing and training Deep Neural Networks, networks with larger scale can express strong non-linear relation between input and output features. However, when learning a desired mode, networks with larger scale are more likely to be influenced by noises in training sets, which makes the mode learnt by the network differs from the desired mode. Since noises are commonly found in training sets and differ from set to set, the network obtained after training might over-fit due to noises in training sets.

One purpose of the present invention is to optimize the compression process for neural networks (e.g. LSTM, used in speech recognition). The process includes storing the pruned result as matrix-shaped mask. By properly using the mask during fine-tuning process while keeping the compression ratio unchanged, the accuracy of the neural networks after pruning can be maintained or even improved.

SUMMARY

According to one aspect of the invention, a method for compressing a neural network $nnet^0$ with a mask matrix is proposed, wherein the neural network is characterized by a plurality of matrices. The method comprises: mask matrix obtaining step of obtaining a mask matrix M, wherein the mask matrix records the distribution of non-zero elements in a plurality of sparse matrices of the neural network; first pruning step of pruning the neural network $nnet^0$ using the mask matrix M to obtain a pruned neural network $nnet_i^1$; first retraining step of retraining the pruned neural network $nnet_i^1$ without a mask, wherein the pruned neural network $nnet_i^1$ is retrained without using the mask matrix M to obtain a dense neural network $nnet_o^1$; second pruning step of pruning the dense neural network $nnet_o^1$ using the mask matrix M to obtain a sparse neural network $nnet_i^2$; second retraining step of retraining the sparse neural network $nnet_i^2$ using the mask matrix M to obtain a final neural network $nnet_o^2$.

According to another aspect of the invention, a device for compressing a neural network with a mask matrix is proposed, wherein the neural network is characterized by a plurality of matrix. The device comprises: a mask matrix obtaining unit, configured for obtaining a mask matrix M, wherein the mask matrix M records the distribution of non-zero elements in a plurality of sparse matrices of the neural network; a first pruning unit, configured for pruning the neural network $nnet^0$ using the mask matrix M to obtain a pruned neural network $nnet_i^1$; a first retraining unit, configured for retraining the pruned neural network $nnet_i^1$ obtained from the first pruning unit without using said mask matrix M to obtain a dense neural network $nnet_o^1$; a second pruning unit, configured for pruning the dense neural network $nnet_o^1$ using the mask matrix M to obtain a sparse neural network $nnet_i^2$; a second retraining unit, configured for retraining the sparse neural network $nnet_i^2$ using the mask matrix M to obtain a final neural network $nnet_o^2$.

BRIEF DESCRIPTION OF THE DRAWINGS

FIG. 5 shows a deep learning model applied in the speech recognition engine;

EMBODIMENTS OF THE INVENTION

Previous Research Products of the Inventors

In the article "Learning both weights and connections for efficient neural networks", Han et al. proposed to prune less influential connections in neural networks (for example, CNNs). The pruning method includes the following steps:

Initializing: Initializing the ANN to establish all connections of CONV layers and FC layers, said connections being assigned weights of random values.

Training: Training said ANN by adjusting connection weights of CONV layers and FC layers of ANN until the accuracy of ANN reaches a predetermined level. Said training uses a stochastic gradient descent algorithm to adjust weights of ANN. For example, the values of weights are stochastically adjusted, and then some adjusted weights are chosen based on the gradient descent of ANN's accuracy. The accuracy of ANN can be measured by, for example, inputting a benchmark test data to the ANN and decide how accurate the prediction results of said ANN is.

Pruning: Pruning said ANN to remove insignificant connections, wherein said insignificant connections are decided based on a predetermined criterion. More specifically, the weights of the pruned connections are no longer stored. For example, pruning uses at least one of the following criteria as said predetermined criteria: if the weight of a connection is zero, said connection is insignificant; or, if the weight of a connection is smaller than a threshold, said connection is insignificant.

Fine-tuning: Fine-tuning said ANN to restore the pruned connections and assigning zero-value weights to these restored connections.

Iteration: Repeating the above-mentioned steps, until the accuracy of ANN reaches a predetermined level.

Improvements of the Present Invention

The present invention proposes a multi-iteration compression method for deep neural networks.

Figure 1:
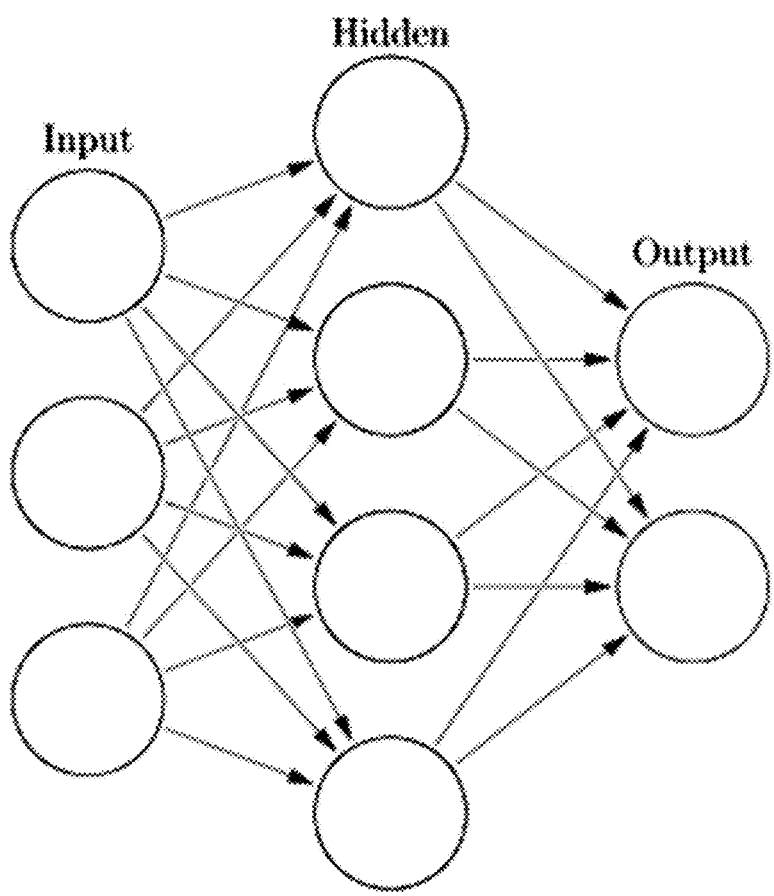
FIG. 1 shows a model of deep neural networks.
Figure 2:
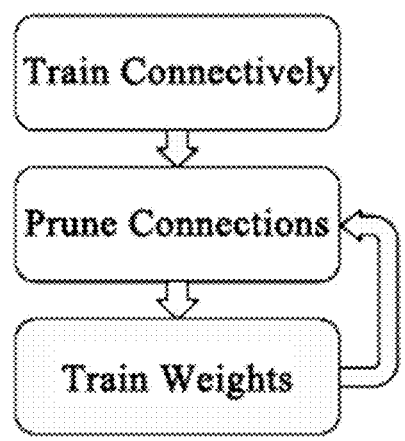
FIG. 2 shows a compression method for neural networks.
Figure 3:
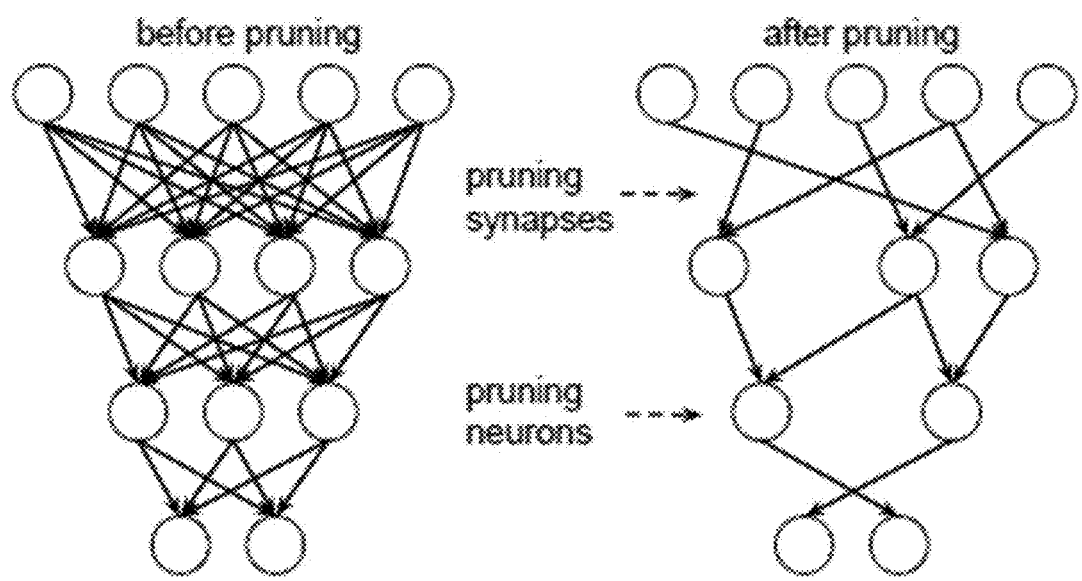
FIG. 3 shows synapses and neurons before and after pruning.
Figure 4:
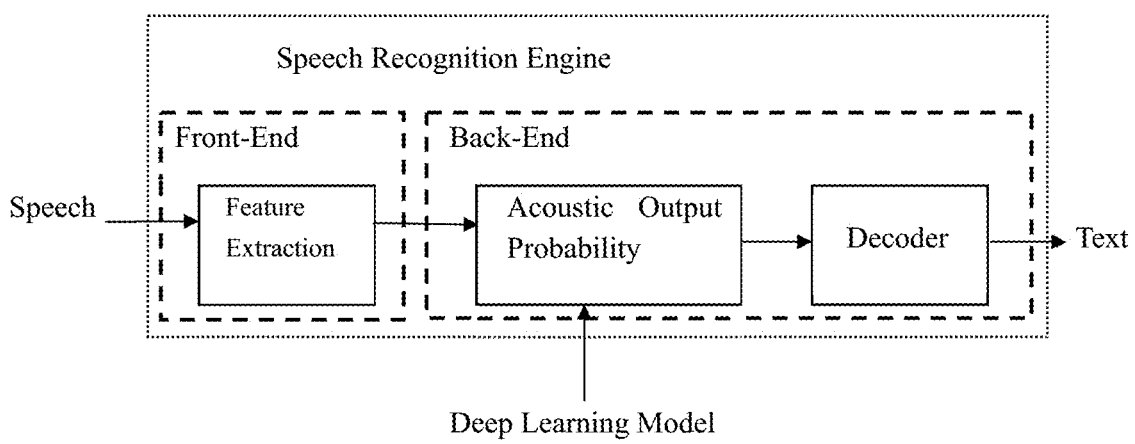
FIG. 4 shows an example of a speech recognition engine using DNNs.
Figure 6:
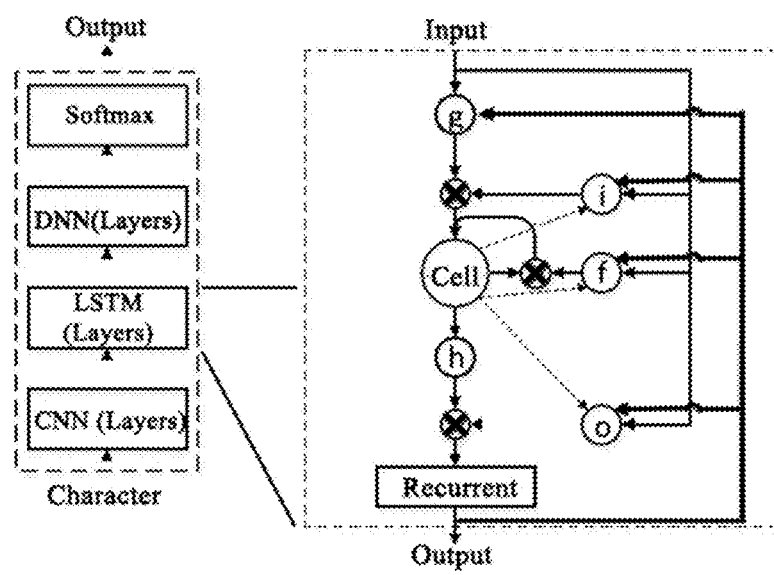
FIG. 6 shows a LSTM network model applied in speech recognition.
Figure 7:
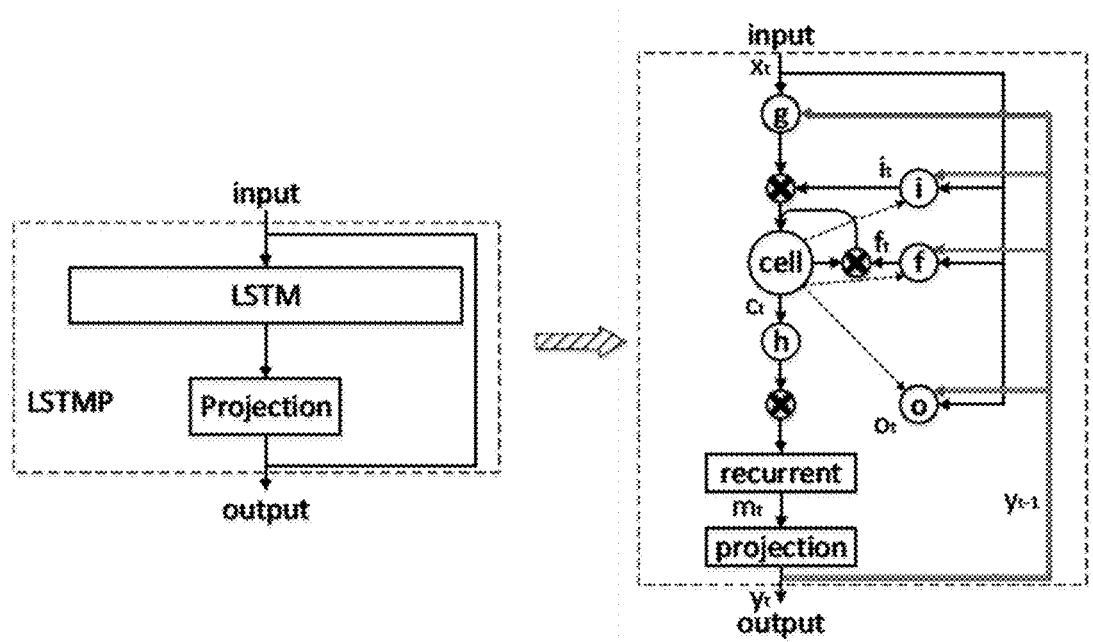
FIG. 7 shows an improved LSTM network model.
Figure 8:
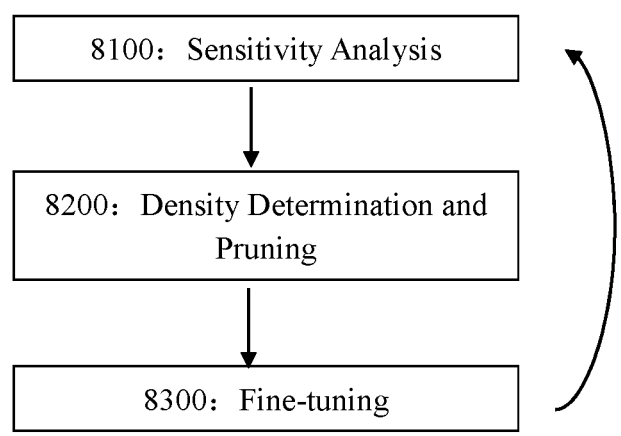
FIG. 8 shows a multi-iteration compression method for LSTM neural networks according to one embodiment of the present invention.

FIG. 8 shows a multi-iteration compression method for LSTM neural networks according to one embodiment of the present invention. It should be noted that the proposed compression method can also be applied in other types of neural networks.

According to the embodiment shown in FIG. 8, each iteration comprises three steps: sensitivity analysis, pruning and fine-tuning. Now, each step will be explained in detail.

Step 8100: Sensitivity Analysis

In this step, sensitivity analysis is conducted for all the matrices in a LSTM network, so as to determine the initial densities (or, the initial compression ratios) for different matrices in the neural network.

Figure 9:
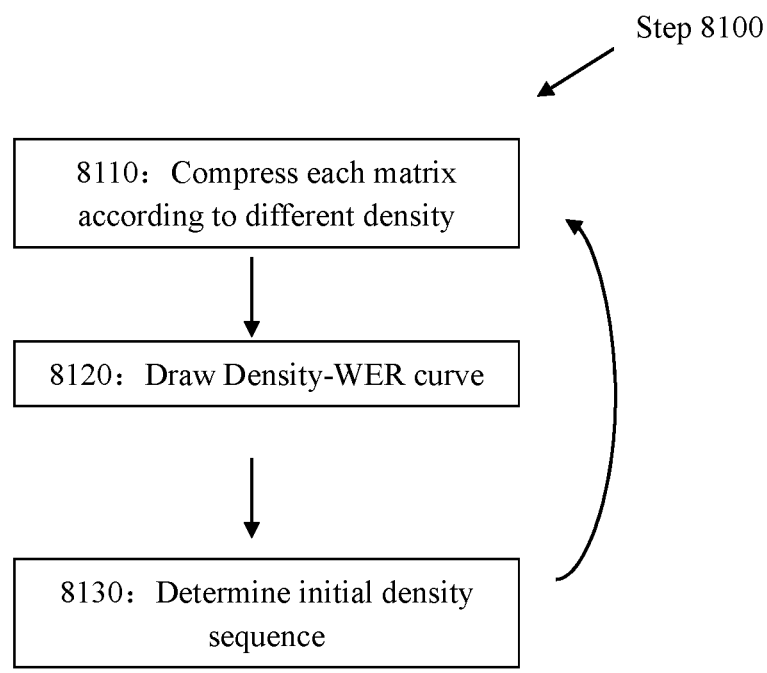
FIG. 9 shows the steps in sensitivity analysis according to one embodiment of the present invention.

FIG. 9 shows the specific steps in sensitivity analysis according to the embodiment.

As can be seen from FIG. 9, in step 8110, it compresses each matrix in LSTM network according to different densities (for example, the selected densities are 0.1, 0.2 ... 0.9, and the related compression method is explained in detail in step 8200).

Next, in step 8120, it measures the word error ratio (WER) of the neural network compressed under different densities. More specifically, when recognizing a sequence of words, there might be words that are mistakenly inserted, deleted or substituted. For example, for a text of N words, if I words were inserted, D words were deleted and S words were substituted, then the corresponding WER will be:

$$WER=(I+D+S)/N.$$

WER is usually measured in percentage. In general, the WER of the network after compression will increase, which means that the accuracy of the network after compression will decrease.

In step 8120, for each matrix, it further draws a Density-WER curve based on the measured WERs as a function of different densities, wherein x-axis represents the density and y-axis represents the WER of the network after compression.

In step 8130, for each matrix, it locates the point in the Density-WER curve where WER changes most abruptly, and choose the density that corresponds to said point as the initial density.

In particular, in one embodiment, we select the density which corresponds to the inflection point in the Density-WER curve as the initial density of the matrix. More specifically, in one iteration, the inflection point is determined as follows:

The WER of the initial neural network before compression in the present iteration is known as $WER_{initial}$;

The WER of the network after compression according to different densities is: $WER_{0.1}$, $WER_{0.2}$ ... $WER_{0.9}$, respectively;

Calculate $\Delta WER$, i.e., deducting $WER_{0.1}$ with $WER_{initial}$, $WER_{0.2}$ with $WER_{initial}$ ..., $WER_{0.9}$ with $WER_{initial}$ respectively.

Based on the plurality of calculated $\Delta WERs$, the inflection point refers to the point with the smallest density among all the points with a $\Delta WER$ below a certain threshold. However, it should be understood that the point where WER changes most abruptly can be selected according to other criteria, and all such variants shall fall into the scope of the present invention.

In one example, for a LSTM network with 3 layers where each layer comprises 9 dense matrices (Wix, Wfx, Wcx, Wox, Wir, Wfr, Wcr, Wor, and Wrm) to be compressed, a total number of 27 dense matrices need to be compressed.

First of all, for each matrix, conducting 9 compression tests with different densities ranging from 0.1 to 0.9 with a step of 0.1. Then, for each matrix, measuring the WER of the whole network after each compression test, and drawing the corresponding Density-WER curve. Therefore, for a total number of 27 matrices, we obtain 27 curves.

Next, for each matrix, locating the inflection point in the corresponding Density-WER curve. Here, we assume that the inflection point is the point with the smallest density among all the points with a ΔWER below 1%.

For example, in the present iteration, assuming the WER of the initial neural network before compression is 24%, then the point with the smallest density among all the points with a WER below 25% is chosen as the inflection point, and the corresponding density of this inflection point is chosen as the initial density of the corresponding matrix.

In this way, we can obtain an initial density sequence of 27 values, each corresponding to the initial density of the corresponding matrix. Thus, this sequence can be used as guidance for further compression.

An example of the initial density sequence is as follows, wherein the order of the matrices is Wcx, Wix, Wfx, Wox, Wcr, Wir, Wfr, Wor, and Wrm.

densityList=[0.2, 0.1, 0.1, 0.1, 0.3, 0.3, 0.1, 0.1, 0.3, 0.5, 0.1, 0.1, 0.1, 0.2, 0.1, 0.1, 0.1, 0.3, 0.4, 0.3, 0.1, 0.2, 0.3, 0.3, 0.1, 0.2, 0.5]

Figure 10:
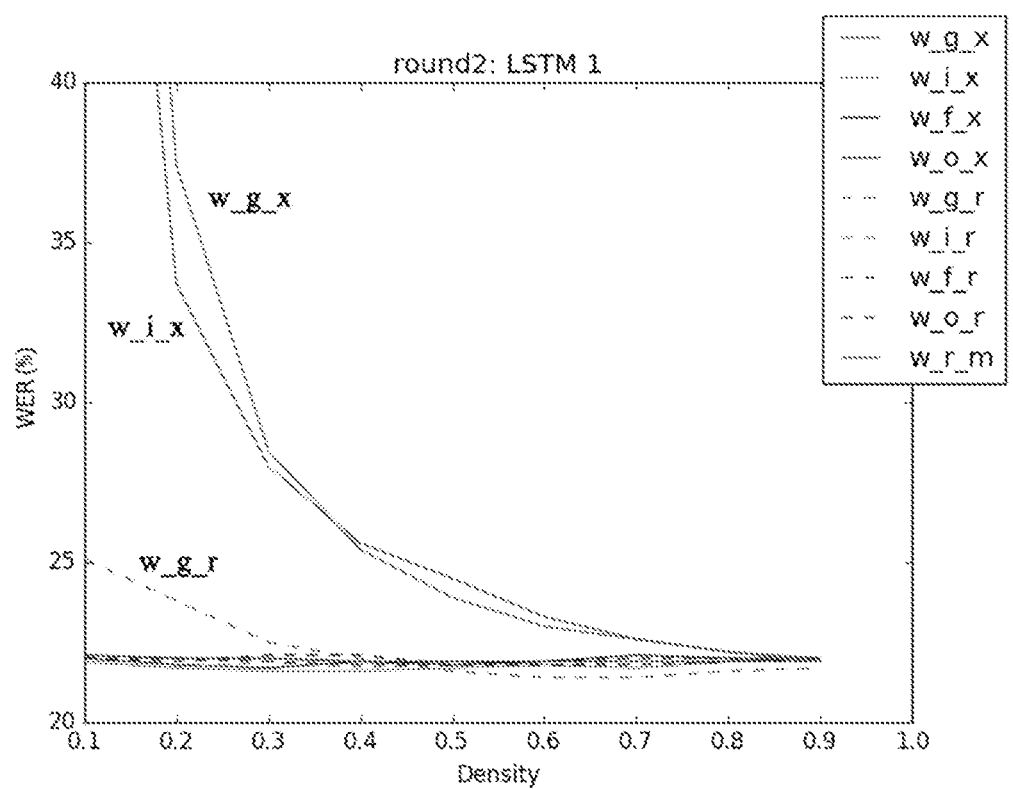
FIG. 10 shows the corresponding curves obtained by the sensitivity tests according to one embodiment of the present invention.

FIG. 10 shows the corresponding Density-WER curves of the 9 matrices in one layer of the LSTM neural network. As can be seen from FIG. 10, the sensitivity of each matrix to be compressed differs dramatically. For example, w__gx, w__rm, w__gr are more sensitive to compression as there are points with max (ΔWER)>1% in their Density-WER curves.

Step 8200: Density Determination and Pruning

Figure 11:
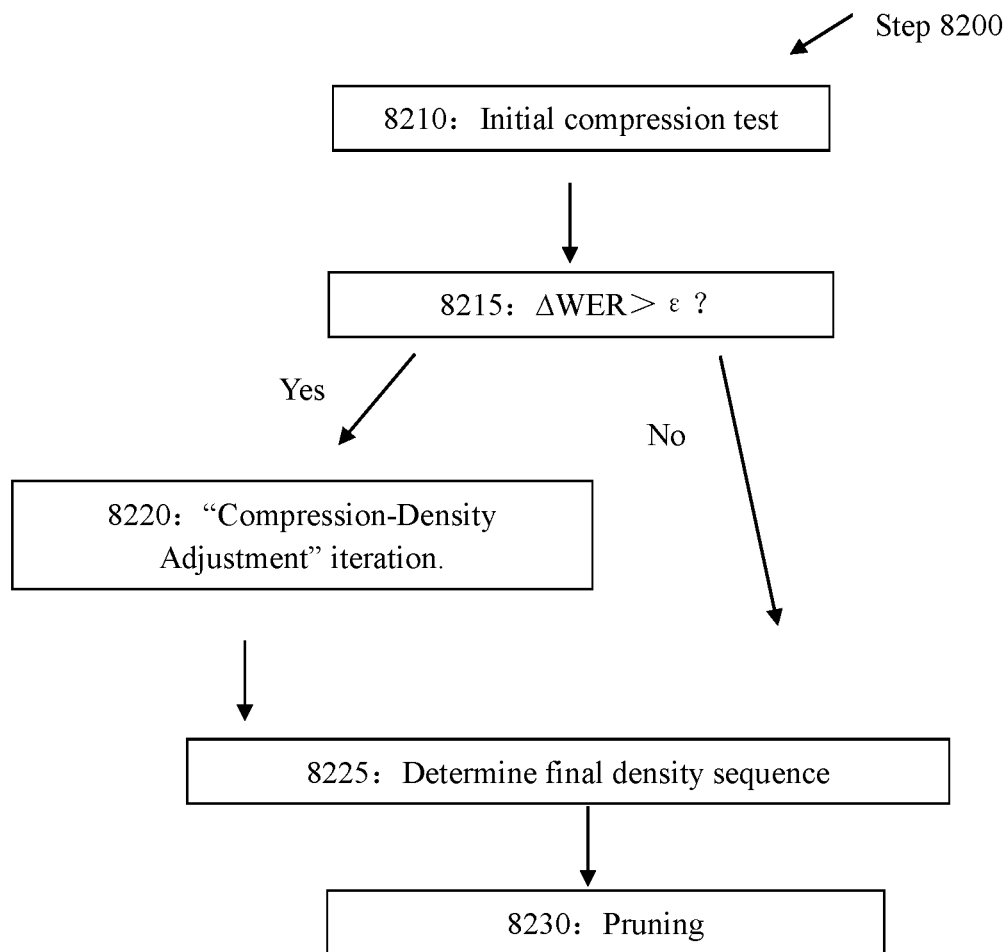
FIG. 11 shows the steps in density determination and pruning according to one embodiment of the present invention.

FIG. 11 shows the specific steps in density determination and pruning.

As can be seen from FIG. 11, step 8200 comprises several sub-steps.

First of all, in step 8210, compressing each matrix based on the initial density sequence determined in step 8130.

Then, in step 8215, measuring the WER of the neural network obtained in step 8210. If ΔWER of the network before and after compression is above a certain threshold ε, for example, 4%, then goes to the next step 8220.

In step 8220, adjusting the initial density sequence via "Compression-Density Adjustment" iteration.

In step 8225, obtaining the final density sequence.

In step 8215, if ΔWER of the neural network before and after compression does not exceed said threshold ε, then it goes to step 8225 directly, and the initial density sequence is set as the final density sequence.

Lastly, in step 8230, pruning the LSTM neural network based on the final density sequence.

Now, each sub-step in FIG. 11 will be explained in more detail.

Step 8210, conducting an initial compression test on the basis of an initial density.

Based on previous studies, the weights with larger absolute values in a matrix correspond to stronger connections between the neurons. Thus, in this embodiment, compression is made according to the absolute values of elements in a matrix. However, it should be understood that other compression strategy can be used, and all of which fall into the scope of the present invention.

According to one embodiment of the present invention, in each matrix, all the elements are ranked from small to large according to their absolute values. Then, each matrix is compressed according to the initial density determined in Step 8100, and only a corresponding ratio of elements with larger absolute values are remained, while other elements with smaller values are set to zero. For example, if the initial density of a matrix is 0.4, then only 40% of the elements in said matrix with larger absolute values are remained, while the other 60% of the elements with smaller absolute values are set to zero.

Step 8215, determining whether ΔWER of the network before and after compression is above a certain threshold E for example, 4%.

Step 8220, if ΔWER of the network before and after compression is above said threshold E for example, 4%, then conducting the "Compression-Density Adjustment" iteration.

Step 8225, obtaining the final density sequence through density adjustment performed in step 8220.

Figure 12:
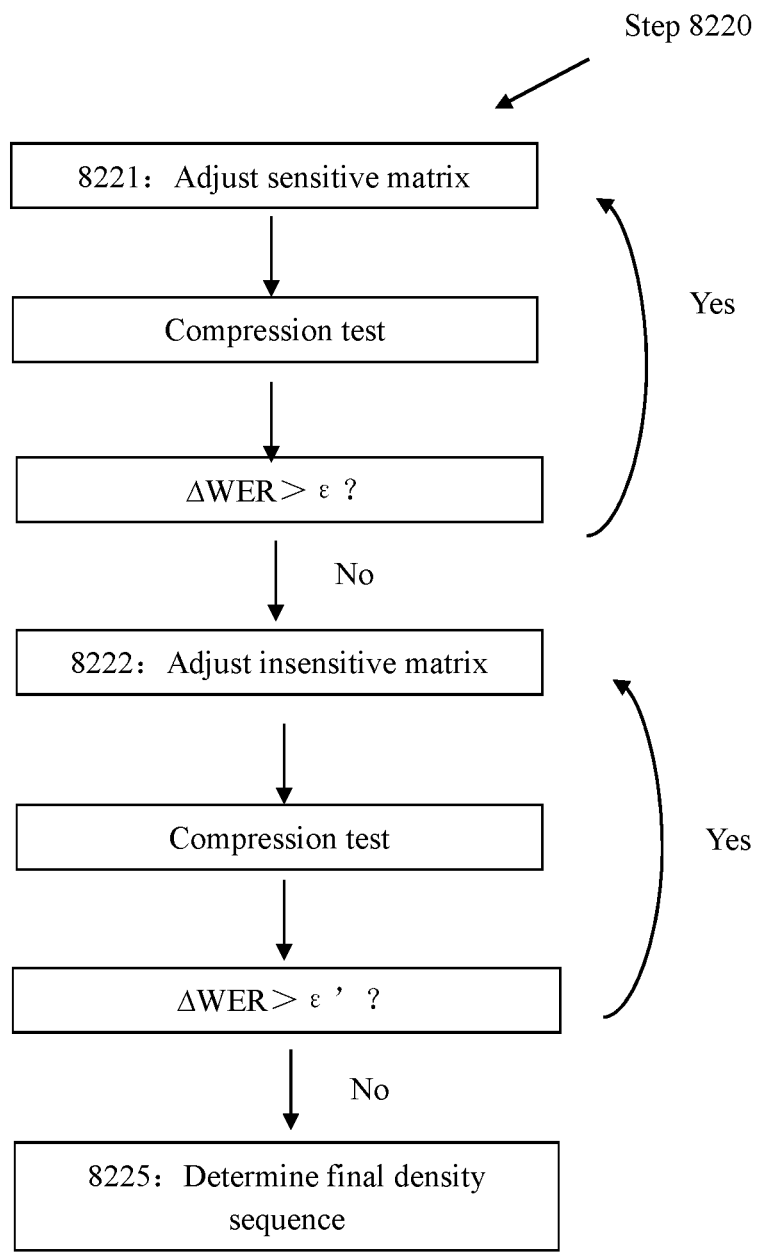
FIG. 12 shows the sub-steps in "Compression-Density Adjustment" iteration according to one embodiment of the present invention.

FIG. 12 shows the specific steps in the "Compression-Density Adjustment" iteration.

As can be seen in FIG. 12, in step 8221, it adjusts the density of the matrices that are relatively sensitive. That is, for each sensitive matrix, increasing its initial density, for example, by 0.05. Then, conducting a compression test for said matrix based on the adjusted density.

In the embodiment of the present invention, the compression test is conducted in a similar manner as the initial compression test of step 8210. However, it should be understood that other compression strategies can be used, all of which fall into the scope of the present invention.

Then, it calculates the WER of the network after compression. If the WER is still unsatisfactory, continuing to increase the density of corresponding matrix, for example, by 0.1. Then, conducting a further compression test for said matrix based on the re-adjusted density. Repeating the above steps until ΔWER of the network before and after compression is below said threshold ε, for example, 4%.

Optionally or sequentially, in step 8222, the density of the matrices that are less sensitive can be adjusted slightly, so that ΔWER of the network before and after compression can be below certain threshold ε', for example, 3.5%. In this way, the accuracy of the network after compression can be further improved.

As can be seen in FIG. 12, the process for adjusting insensitive matrices is similar to that for sensitive matrices.

In one example, the initial WER of a network is 24.2%, and the initial density sequence of the network obtained in step 8100 is:

densityList=[0.2, 0.1, 0.1, 0.1, 0.3, 0.3, 0.1, 0.1, 0.3, 0.5, 0.1, 0.1, 0.1, 0.2, 0.1, 0.1, 0.1, 0.3, 0.4, 0.3, 0.1, 0.2, 0.3, 0.3, 0.1, 0.2, 0.5], After pruning the network according to the initial density sequence, the WER of the compressed network is worsened to be 32%, which means that the initial density sequence needs to be adjusted. The steps for adjusting the initial density sequence is as follows:

According to the result in step 8100, as shown in FIG. 10, Wcx, Wcr, Wir, Wrm in the first layer, Wcx, Wcr, Wrm in the second layer, and Wcx, Wix, Wox, Wcr, Wir, Wor, Wrm in the third layer are relatively sensitive, while the other matrices are insensitive.

First of all, increasing the initial densities of the above sensitive matrices by 0.05, respectively.

Then, conducting compression tests based on the increased density. The resulting WER after compression is 27.7%, which meets the requirement of ΔWER<4%. Thus, the step for adjusting the densities of sensitive matrices is completed.

According to another embodiment of the present invention, optionally, the density of matrices that are less sensitive can be adjusted slightly, so that ΔWER of the network before and after compression will be below 3.5%. In this example, this step is omitted.

Thus, the final density sequence obtained via "Compression-Density Adjustment" iteration is as follows:

densityList=[0.25, 0.1, 0.1, 0.1, 0.35, 0.35, 0.1, 0.1, 0.35, 0.55, 0.1, 0.1, 0.1, 0.25, 0.1, 0.1, 0.1, 0.35, 0.45, 0.35, 0.1, 0.25, 0.35, 0.35, 0.1, 0.25, 0.55]

The overall density of the neural network after compression is now around 0.24.

Step 8230, pruning based on the final density sequence.

For example, in the present embodiment, pruning is also based on the absolute values of the elements in the matrices.

More specifically, for each matrix, all elements are ranked from small to large according to their absolute values. Then, each matrix is compressed according to its final density, and only a corresponding ratio of elements with larger absolute values are remained, while other elements with smaller values are set to zero.

Step 8300, Fine Tuning

Neural network training is a process for optimizing loss function. Loss function refers to the difference between the ideal result and the actual result of a neural network model under predetermined input. It is therefore desirable to minimize the value of loss function.

Indeed, the essence of neural network training lies in the search of optimal solution. Fine tuning (or, retraining) is to search the optimal solution based on a suboptimal solution. That is, continuing to train the neural network on certain basis.

Figure 13:
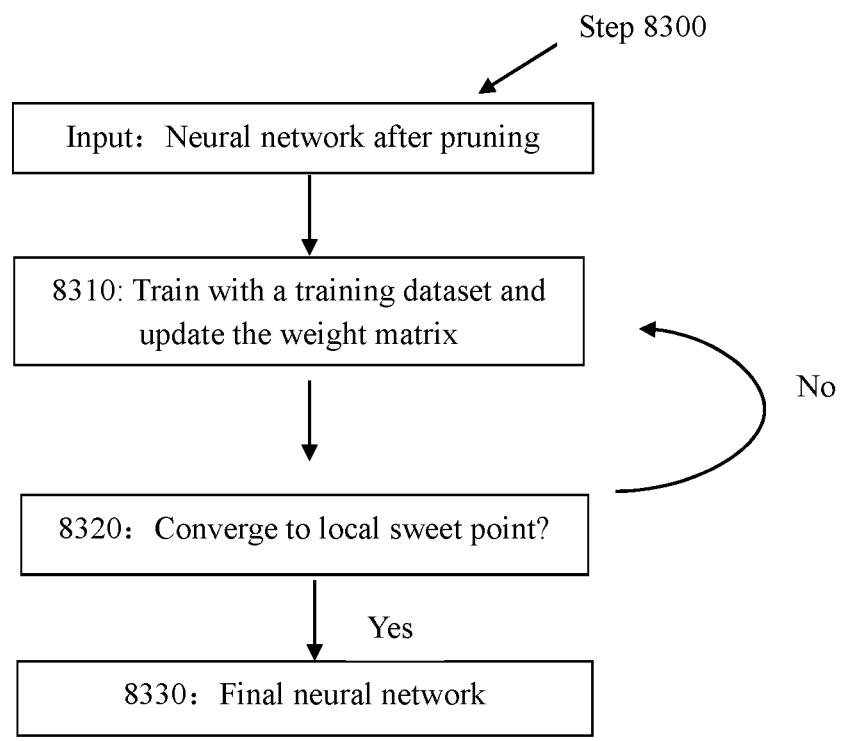
FIG. 13 shows the steps in fine-tuning according to one embodiment of the present invention.

FIG. 13 shows the specific steps in fine-tuning.

As can be seen from FIG. 13, the input of fine-tuning is the neural network after pruning in step 8200.

In step 8310, it trains the sparse neural network obtained in step 8200 with a predetermined data set, and updates the weight matrix.

Then, in step 8320, it determines whether the matrix has converged to a local sweet point. If not, it goes back to step 8310 and repeats the training and updating process; and if yes, it goes to step 8330 and obtains the final neural network.

In one specific embodiment of the present invention, stochastic gradient descent algorithm is used during fine-tuning to update the weight matrix.

More specifically, if real-value function F(x) is differentiable and has definition at point a, then F(x) descents the fastest along−∇F(a) at point a.

Thus, if:

$$b = a - \gamma \nabla F(a)$$

is true when γ0 is a value that is small enough, then F(a)≥F(b), wherein a is a vector.

In light of this, we can start from $x_0$ which is the local minimal value of function F, and consider the following sequence $x_0, x_1, x_2, \ldots$, so that:

$$x_{n+1} = x_n - \gamma_n \nabla F(x_n), n \geq 0$$

Thus, we can obtain:

$$F(x_0) \geq F(x_1) \geq F(x_2) \geq \ldots$$

Desirably, the sequence ($x_n$) will converge to the desired extreme value. It should be noted that in each iteration, step γ can be changed.

Here, F(x) can be interpreted as a loss function. In this way, stochastic gradient descent algorithm can help reducing prediction loss.

In one example, and with reference to "DSD: Regularizing Deep Neural Networks with Dense-Sparse-Dense Training Flow in NIPS 2016", the fine-tuning method of LSTM neural network is as follows:

---
Initial Dense Phase
---
while not converged do
|   $\tilde{W}^{(t)} = W^{(t-1)} - \eta^{(t)} \nabla f(W^{(t-1)}; x^{(t-1)})$;
|   t = t + 1;
end
---

Here, W refers to weight matrix, η refers to learning rate (that is, the step of the stochastic gradient descent algorithm), f refers to loss function, ∇F refers to gradient of the loss function, x refers to training data, and t+1 refers to weight update.

The above equations means updating the weight matrix by subtracting the product of learning rate and gradient of the loss function (η*∇F) from the weight matrix.

In another example, a mask matrix containing only "0" and "1" is used to keep the distribution of non-zero elements in the matrix after compression.

In general, fine-tuning with mask is as follows:

$$\tilde{W}^{(t)} = W^{(t-1)} - \eta^{(t)} \nabla f(W^{(t-1)}; x^{(t-1)}) \cdot \text{Mask}$$

$$\text{Mask} = (W^{(0)} \neq 0)$$

As can be seen from the above equations, the gradient of the loss function is multiplied by the mask matrix, assuring that the gradient matrix will have the same shape as the mask matrix.

The following is a specific example illustrating an exemplary fine-tuning process and convergence criteria.

In this example, the input of fine-tuning includes: the network to be trained, the learning rate, max_iters (which refers to the maximum number of training iterations), min_iters (which refers to the minimum number of training iterations), keep_lr_iters (which refers to the number of iterations that keep the initial learning rate), start_halving_impr (which is used for determining when to change the learning rate, for example, 0.01), end_halving_impr (which is used to determine when to terminate the training, for example, 0.001), halving_factor (for example, 0.5), data sets (including training set, cross-validation set, testing set), etc.

In addition, the input of fine-tuning also includes parameters such as learning momentum, num-stream, batch-size, etc., all of which are omitted detailed description herein.

The output of fine-tuning is the well-trained network.

The detail process of fine-tuning is as follows:

1. Testing the cross loss (hereinafter referred to as "loss") of the initial network model to be trained using the cross-validation set, wherein the loss is the initial standard to evaluate the performance of network training;

2. Iterative Training:

Iterative training is divided into several "epochs", wherein an epoch (hereinafter referred to as "one iteration") means that all data in the training dataset has been run for once, and the total number of iterations shall not be more than max_iters or less than min_iters;

In each iteration, updating the weight matrix of the network using the stochastic gradient descent algorithm and the training dataset;

After each iteration, storing the trained network and testing its loss using the cross-validation set. If the loss of the present iteration is larger than that of the previous valid training (referred to as loss_prev), than the present iteration is rejected and the next iteration will still be conducted based on the result of the previous iteration; and if the loss of the present iteration is smaller than loss_prev, the present iteration is accepted and the next iteration will be conducted based on the result of the present iteration, and the loss of the present iteration is stored;

Conditions for learning rate modification and training termination: input parameters related to learning rate modification and training termination includes: start_halving_impr, end_halving_impr, halving_factor, etc. After each iteration, calculating the improvement (referred to as real_impr) based on (loss_prev-loss)/loss_prev, wherein real_impr refers to the relative improvement of the loss of the present iteration compared to that of the previous iteration. Then, based on real_impr, we have:

1) If the number of iterations is less than keep_lr_iters, then it keeps the learning rate unchanged;

2) If real_impr is less that start_halving_impr (for example, 0.01), that is, if the improvement of the present iteration compared to that of the previous iteration is within a relatively small range, which means that the network is close to its local sweet point, then it decreases the learning rate by multiplying said learning rate by said halving_factor (which is usually 0.5). In this way, the step of the stochastic gradient descent algorithm is decreased, so that the network will approach the local sweet point with smaller step;

3) If real_impr is less that end_halving_impr (for example, 0.001), that is, if the improvement of the present iteration compared to that of the previous iteration is very small, then it terminates the training. However, if the number of iterations is smaller than min_iters, then it continues the training until the number of iterations reaches min_iters.

Thus, there will be four possible results when the training terminates, which are:

1. If the network is trained for min_iters and during which real_impr is always larger than end_halving_impr, then it takes the result of the final iteration;

2. If the network is trained for min_iters and during which real_impr being smaller than end_halving_impr occurs, then it takes the result of the iteration with the minimal loss;

3. If the network is trained for more than min_iters but less than max_iters and during which real_impr being smaller than end_halving_impr occurs, then it takes the result of the final iteration, i.e. the result of the iteration with the minimal loss;

4) If the network is trained for max_iters and during which real_impr is always larger than end_halving_impr, then take the result of the final iteration.

It should be noted that the above example shows one possible fine-tuning process and a convergence criterion to determine whether the matrix has converged to its local sweet point. However, in practical operations, in order to improve compression efficiency, it is not necessary to wait for the final convergence result. It could take an intermediate result and start the next iteration.

Moreover, convergence criteria can also be whether the WER of the trained network meets certain standard, for example. It should be understood that these criteria also fall into the scope of the present invention.

Thus, the WER of the network decreases via fine-tuning, reducing accuracy loss due to compression. For example, the WER of a compressed LSTM network with a density of 0.24 can drop from 27.7% to 25.8% after fine-tuning.

Iteration (repeating 8100, 8200 and 8300)

Referring again to FIG. 8, as mentioned above, the neural network will be compressed to a desired density via multi-iteration, that is, by repeating the above-mentioned steps 8100, 8200 and 8300.

For example, the desired final density of one exemplary neural network is 0.14.

After the first iteration, the network obtained after Step 8300 has a density of 0.24 and a WER of 25.8%.

Then, steps 8100, 8200 and 8300 are repeated.

After the second iteration, the network obtained after Step 8300 has a density of 0.18 and a WER of 24.7%.

After the third iteration, the network obtained after Step 8300 has a density of 0.14 and a WER of 24.6% which meets the requirements.

Further Improvements of the Present Invention

Compression of deep neural networks essentially is to sparsify weight matrices in deep neural networks. Sparse weight matrices will have many zero elements which do not participate in computation. Therefore, the number of calculations will reduce, and computation speed will increase accordingly. Meanwhile, for a highly compressed network (for example, with a density of 0.15), only non-zero weights are stored. Therefore, storage space can be reduced.

However, since the compression process will remove some weights in weight matrix, the accuracy of the whole network will reduce significantly. Therefore, fine-tuning is needed to adjust the remaining weights in the weight matrix, so as to increase the accuracy of the network.

Moreover, since pruning (e.g. setting weights as zero) can be considered as imposing further constraints on the matrices, although the accuracy of the network will increase after fine-tuning, it might still be lower than that of the non-pruned network.

As mentioned above, mask matrix might be used for recording the distribution of non-zero elements in correspond sparse matrix. The mask matrix is generated during pruning and contains only elements "0" and "1", wherein element "1" means that the element in corresponding position of the weight matrix is remained, while element "0" means that the element in corresponding position of the weight matrix is ignored (i.e., set to 0).

Figure 14:
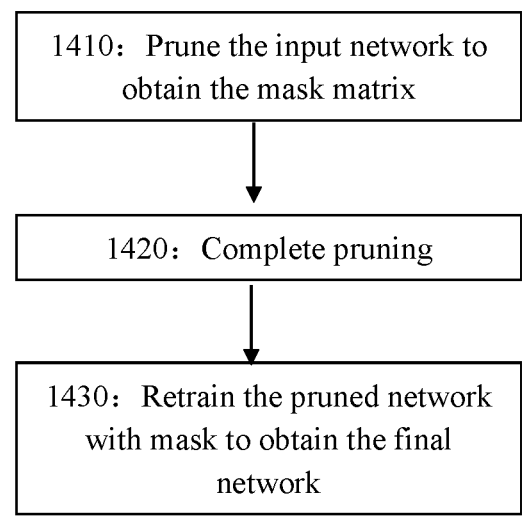
FIG. 14 shows a conventional process of fine-tuning with mask.

FIG. 14 shows a conventional process of fine-tuning a neural network using a mask matrix.

As is shown in FIG. 14, in step 1410, it prunes the network to be compressed $nnet^0$ and obtains a mask matrix M which records the distribution of non-zero elements in corresponding sparse matrix:

$$nnet^0 \rightarrow M$$

More specifically, first of all, it prunes the network to be compressed so as to obtain a sparse matrix containing zero and non-zero elements. Then, it uses the mask matrix M to record the distribution of non-zero elements in the compressed matrix, wherein elements "1" represent the weights of non-zero elements in the sparse matrix.

In step 1420, it point-multiplies the network to be compressed with the mask matrix M obtained in step 1410, and completes the pruning process so as to obtain the network after pruning $nnet_i$:

$$nnet_i = M \odot nnet^0$$

In step 1430, it retrains the network after pruning $nnet_i$ using the mask matrix so as to obtain the final output network $nnet_o$:

$$nnet_o = R_{mask}(nnet_i, M)$$

More specifically, the above formula refers to the process of retraining the network using the mask matrix, so as to optimize per-frame cross-entropy. During this training process $R_{mask}$, only weights that were not pruned will be updated. Therefore, the remaining weights in the weight matrix will be adjusted, so that the neural network will converge to a new local sweet point.

Retraining with mask includes two steps: training step and deciding step. Based on the result of the deciding step, i.e. whether the matrix has converged to a local sweet point, decision will be made on whether to continue or to stop the retraining process.

More specifically, the training step is as follows:

1. Inputting a training dataset, and calculating the derivative of a loss function to the neural network so as to obtain the gradient matrix;

2. Updating the weight matrix of the network using the stochastic gradient descent algorithm and the learning rate, wherein updated weight matrix=weight matrix before updating–(learning rate*gradient matrix*mask matrix). Since the gradient matrix is multiplied by the mask matrix, the gradient matrix will have the same shape as the mask matrix;

3. Calculating the loss of the network using a cross-validation dataset. If the loss of the present iteration is greater than that of the previous valid iteration, then the present iteration is invalid; and if the cross loss of the present iteration is smaller than that of the previous valid iteration, the present iteration is valid;

4. If the present iteration is invalid and the total number of iterations does not reach its maximum, adjusting the learning rate and training the neural network based on the previous valid iteration; and if the present iteration is valid, deciding whether the matrix has converged to a local sweet point.

In the deciding step, different criteria can be used to decide whether the matrix has converged to a local sweet point. Here, we will introduce two kinds of criteria.

Criteria A: WER

If WER is used as said criteria, in the deciding step, it tests the WER of the network in the present valid iteration using a testing dataset. If the WER meets certain condition (e.g. WER smaller than 20%), the network is considered as being converged to the local sweet point and the retraining process can be terminated.

Criteria B: Relative improvement of loss

If relative improvement of loss is used as said criteria, in the deciding step, it calculates the improvement (referred to as real_impr) based on (loss_prev-loss)/loss_prev, wherein real_impr refers to the relative improvement of the loss of the present iteration over that of the previous iteration. If real_impr is less that end_halving_impr (for example, 0.001), that is, if the improvement of the present iteration over that of the previous iteration is very small, the network is considered as being converged to the local sweet point and the retraining process can be terminated.

However, since the fine-tuning process is easily influenced by noises in the training dataset, the network might over-fit, affecting its accuracy.

To overcome this problem, the present invention proposes a fine-tuning process with proper use of the mask, so as to reduce the interference of noises on the network.

According to one embodiment of the present invention, it takes the pruned weights as initial weights of the input network during fine-tuning. For those elements whose weights were set to zero during the pruning process, their corresponding initial weights during fine-tuning are zero. It is generally assumed that weights with smaller absolute values represent relatively unimportant connections. Therefore, we can consider that by using the pruned weights as initial input values during fine-tuning, the fine-tuning process will start from a better starting point where important weights are given larger initial values. In this way, the network will be less influenced by noises in the training dataset. However, some connections might actually be important, but have initial smaller values, and thus will be pruned and will not have the chance to be recovered once a mask is introduced.

In order to address this issue, unlike the conventional fine-tuning method, the present invention adds an additional step of retraining the network without a mask between the pruning process and the process of retraining with mask. By retraining without a mask, it removes the constraints on the shape of the pruned matrix, so as to allow the weights that were previously pruned out in the pruning process to grow again.

Moreover, since the network retrained without a mask is relatively dense, it needs to be compressed. The present disclosure proposes to prune the neural network again. Also, this second pruning operation will affect the accuracy of the network. Therefore, in order to regain the desired accuracy, we need to retrain the network with a mask, so as to allow the network to converge to a local sweet point.

Figure 15:
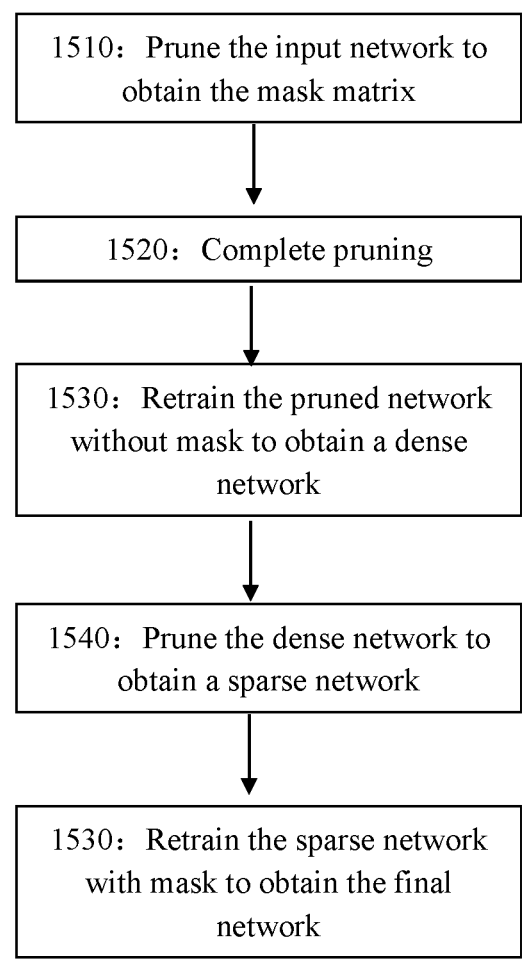
FIG. 15 shows the process of fine-tuning with proper use of mask according to the present invention.

FIG. 15 shows the fine-tuning process with proper use of a mask according to the present invention.

As is shown in FIG. 15, in step 1510, it prunes the network to be compressed $nnet^0$ and obtains the mask matrix M which records the distribution of non-zero elements in compressed matrix:

$$nnet^0 \rightarrow M$$

In step 1520, it point-multiplies the network to be compressed $nnet^0$ with the mask matrix M obtained in step 1510, and completes the pruning process so as to obtain the network after pruning $nnet_i^1$:

$$nnet_i^1 = M \odot nnet^0$$

In step 1530, it retrains the network $nnet_i^1$ without using the mask so as to obtain a dense network $nnet_o^1$:

$$nnet_o^1 = R_{nomask}(nnet_i^1)$$

More specifically, similar to the above mentioned step of retraining the network with a mask, the step of retraining the network without a mask also includes a training step and a deciding step. Based on the result of the deciding step, i.e. whether the matrix has converged to a local sweet point, decision will be made on whether to continue or to stop the retraining process.

In one embodiment, during retraining the network without a mask, the training step is as follows:

1. Inputting a training dataset, and calculating the derivative of a loss function to the neural network so as to obtain the gradient matrix;

2. Updating the weight matrix of network using the stochastic gradient descent algorithm and the learning rate, wherein updated weight matrix=weight matrix before updating–(learning rate*gradient matrix). Here, the gradient matrix is not multiplied by the mask matrix, so that the constraints on the shape of the pruned matrix is removed and the weights that were previously pruned during the pruning process are allowed to grow again.

3. Calculating the loss of the network using a cross-validation dataset. If the loss of the present iteration is greater than that of the previous valid iteration, then the present iteration is invalid; and if the cross loss of the present iteration is smaller than that of the previous valid iteration, the present iteration is valid;

4. If the present iteration is invalid and the total number of iterations does not reach its maximum, adjusting the learning rate and training the neural network based on the previous valid iteration; and if the present iteration is valid, deciding whether the matrix has converged to the local sweet point.

The deciding step in retraining without a mask is similar to that in the above-mentioned step of retraining with a mask.

In step 1540, it point multiplies the dense network $nnet_o^1$ obtained in step 1510 with the mask matrix M, so as to remove the regrew weights that should have been pruned out and obtain a sparse network $nnet_i^2$:

$$nnet_i^2 = M \odot nnet_o^1$$

In step 1550, it retrains the sparse network $nnet_i^2$ using the mask matrix, so as to obtain a final output network $nnet_o^2$:

$$nnet_o^2 = R_{mask}(nnet_i^2, M)$$

By adding an additional step 1530, the accuracy of the network will increase, solving the problem of accuracy degradation of compressed network.

In practical experiment, the accuracy of the compressed network even increases by using the above-mentioned method.

Figure 16:
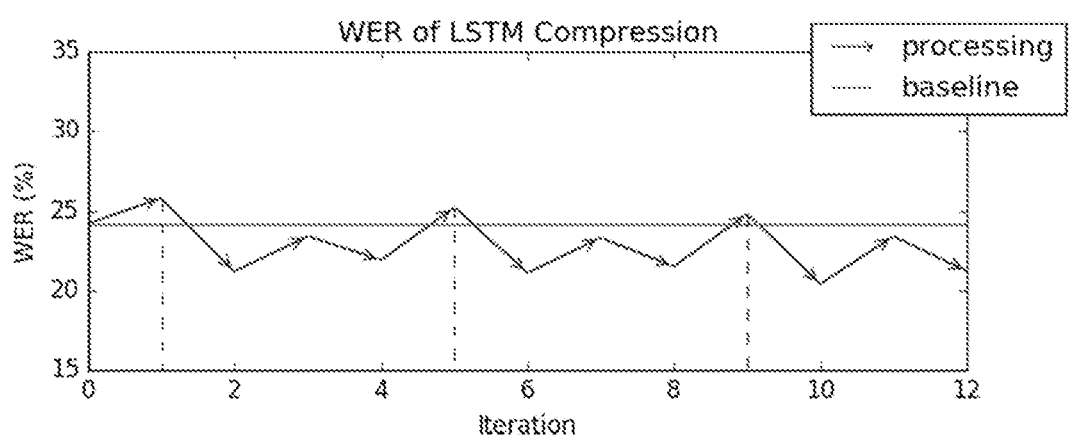
FIG. 16 shows the process and result of compressing a LSTM deep neural network using the fine-tuning process according to the present invention.

FIG. 16 shows the process and performance comparison of compressing a LSTM deep neural network using the method of the present invention, wherein the LSTM network is retrained based on a Chinese voice dataset of several thousand hours.

In FIG. 16, the x-axis refers to operation steps conducted in time sequence, and the y-axis refers to the WER of the neural network. The solid line represents the initial WER of the network to be compressed, and the arrow line represents the process of multi-iteration compression.

In one iteration (for example, operation steps 0-4):

Step 0 represents an initial stage before pruning;

Step 1 represents pruning the network for the first time. The dash line represents the WER after this first pruning. As is shown in FIG. 16, the WER of the network after the first pruning increases;

Step 2 represents retraining the network obtained in step 1 without using the mask matrix. As is shown in FIG. 16, the WER after retraining without mask decreases;

Step 3 represents pruning the network obtained in step 2 for a second time. As is shown in FIG. 16, the WER of the network after the second pruning increases;

Step 3 represents retraining the network obtained in step 3 using the mask. As is shown in FIG. 16, the WER after retraining with mask decreases.

In FIG. 16, steps 4, 8, 12 represent the final resultant WER in each iteration, respectively. As is shown in the figure, in each iteration, the resultant WER decreases significantly compared to initial WER of the iteration, improving the accuracy of the whole network.

Beneficial Technical Effects

According to the above-mentioned technical solution, the present invention proposes a compression method for deep neural networks with proper use of mask. The method according to the present invention further improves the accuracy of the compressed neural networks by a modified fine-tuning process. More specifically, in the fine-tuning process according to the present invention, an additional step of retraining the network without mask is added, increasing the accuracy of the neural networks after compression.

It should be understood that although the above-mentioned embodiments use LSTM neural networks as examples of the present invention, the present invention is not limited to LSTM neural networks, but can be applied to various other neural networks as well.

Moreover, those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:

1. A method for compressing a neural network $nnet^0$ with a mask matrix, said neural network is characterized by a plurality of matrices, said method comprising:

mask matrix obtaining step of obtaining a mask matrix M, wherein said mask matrix M records the distribution of non-zero elements in a plurality of sparse matrices of the neural network;

first pruning step of pruning the neural network $nnet^0$ using said mask matrix M to obtain a pruned neural network $nnet_i^1$;

first retraining step of retraining the pruned neural network $nnet_i^1$ that has a shape of the mask matrix without a mask, wherein the pruned neural network $nnet_i^1$ is retrained without using said mask matrix M to obtain a dense neural network $nnet_o^1$;

second pruning step of pruning said dense neural network $nnet_o^1$ using said mask matrix M to obtain a sparse neural network $nnet_i^2$;

second retraining step of retraining said sparse neural network $nnet_i^2$ using said mask matrix M to obtain a final neural network $nnet_o^2$.

2. The method of claim 1, wherein said mask matrix obtaining step further includes:

pruning said neural network to be compressed $nnet^0$ to obtain a plurality of sparse matrices containing zero and non-zero elements;

obtaining said mask matrix M by using elements "1" to represent non-zero elements in corresponding sparse matrix.

3. The method of claim 1, wherein said first pruning step further includes:

point multiplying said neural network to be compressed $nnet^0$ with said mask matrix M to obtain said pruned neural network $nnet_i^1$: $nnet_i^1 = M \odot nnet^0$.

4. The method of claim 1, wherein said first retraining step further includes:

training step, for training said pruned neural network $nnet_i^1$ using a training dataset and updating a weight matrix of the neural network to generate an updated weight matrix without using said mask matrix M;

deciding step, for determining whether the updated weight matrix has converged;

if not, returning to said training step; and if yes, the resultant neural network is regarded as said dense neural network $nnet_o^1$.

5. The method according to claim 4, wherein said training step further includes:

- inputting said training dataset and calculating the derivative of a loss function for the neural network so as to obtain a gradient matrix;
- updating the weight matrix of the neural network, wherein the updated weight matrix=weight matrix before updating− learning rate*gradient matrix;
- calculating the loss of the neural network based on said updated weight matrix;
- deciding whether the present iteration is valid, wherein if the loss of the present iteration is greater than that of the previous iteration, then the present iteration is invalid; and
- if the loss of the present iteration is smaller than that of the previous iteration, the present iteration is valid;
- if the present iteration is invalid and the total number of iterations does not reach its maximum, adjusting the learning rate and repeating the training step based on the previous valid iteration;
- if the present iteration is valid, repeating said deciding step for determining whether said updated weight matrix has converged.

6. The method of claim 1, wherein said second pruning step further includes:

- point multiplying said dense neural network $nnet_o^1$ with said mask matrix M to obtain said sparse neural network $nnet_i^2$: $nnet_i^2 = M \odot nnet_o^1$.

7. The method of claim 1, wherein said second retraining step further includes:

- training step, for training said sparse neural network $nnet_i^2$ using a training dataset and updating a weight matrix of the neural network to generate an updated weight matrix using said mask matrix M;
- deciding step, for determining whether the updated weight matrix has converged;
- if not, returning to said training step; and
- if yes, the resultant neural network is regarded as said final neural network $nnet_o^2$.

8. The method according to claim 7, wherein said training step further includes:

- inputting said training dataset and calculating the derivative of a loss function for the neural network so as to obtain a gradient matrix;
- updating the weight matrix of the neural network, wherein the updated weight matrix=weight matrix before updating− learning rate*gradient matrix*said mask matrix;
- calculating the loss of the neural network based on said updated weight matrix;
- deciding whether the present iteration is valid, wherein if the loss of the present iteration is greater than that of the previous iteration, then the present iteration is invalid; and
- if the loss of the present iteration is smaller than that of the previous iteration, the present iteration is valid;
- if the present iteration is invalid and the total number of iterations does not reach its maximum, adjusting the learning rate and repeating the training step based on the previous valid iteration;
- if the present iteration is valid, repeating said deciding step for determining whether said updated weight matrix has converged.

9. The method according to claim 1, wherein said mask matrix M contains elements "0" and "1", wherein:

- elements "1" mean that elements in corresponding position of a weight matrix of the neural network are remained, while elements "0" mean that elements in corresponding position of the weight matrix are set to zero.

* * * * *